(12) United States Patent
Aldrich et al.

(10) Patent No.: US 8,891,131 B1
(45) Date of Patent: Nov. 18, 2014

(54) SYSTEMS AND METHODS FOR GENERATING A TRANSFER FUNCTION TO PROCESS IMAGE DATA

(71) Applicant: Marvell International Ltd., Hamilton (BM)

(72) Inventors: Bradley C. Aldrich, Austin, TX (US); Moinul H. Khan, Austin, TX (US); Kayla L. Chalmers, Austin, TX (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/190,506

(22) Filed: Feb. 26, 2014

Related U.S. Application Data

(62) Division of application No. 10/812,626, filed on Mar. 29, 2004, now Pat. No. 8,665,486.

(51) Int. Cl.
*H04N 1/56* (2006.01)
*H04N 9/64* (2006.01)
*H04N 9/04* (2006.01)

(52) U.S. Cl.
CPC .............. *H04N 9/641* (2013.01); *H04N 9/045* (2013.01)
USPC ............ 358/1.9; 358/504; 358/519; 358/523

(58) Field of Classification Search
CPC ............................ G06F 7/544; H04N 1/6019
USPC .................... 358/1.9, 504, 523, 519
See application file for complete search history.

(56) References Cited

U.S. PATENT DOCUMENTS

| 5,600,574 A | * | 2/1997 | Reitan | ............................ 702/185 |
| 2002/0030751 A1 | * | 3/2002 | Takane | ............................ 348/222 |
| 2005/0057303 A1 | * | 3/2005 | Leffel | ............................ 330/75 |

* cited by examiner

*Primary Examiner* — King Poon
*Assistant Examiner* — Iriana Cruz

(57) ABSTRACT

A system including an image data source and a transfer function module. The image data source is configured to provide image data. The transfer function module is configured to generate a transfer function to process the image data, define a first region of the transfer function, wherein a curvature of the transfer function in the first region is less than or equal to a threshold, define a second region of the transfer function, wherein a curvature of the transfer function in the second region is greater than the threshold, allocate a first number of sample inputs to the first region, allocate a second number of the sample inputs to the second region, wherein the second number is greater than the first number, map the sample inputs to sample outputs using the transfer function, and populate entries of a lookup table with the sample outputs.

20 Claims, 6 Drawing Sheets

Two example transfer functions showing high and low curvature regions

SYSTEMS AND METHODS FOR GENERATING A TRANSFER FUNCTION TO PROCESS IMAGE DATA

CROSS-REFERENCE TO RELATED APPLICATIONS

The present disclosure is a divisional of U.S. patent application Ser. No. 10/812,626 (now U.S. Pat. No. 8,665,486), filed on Mar. 29, 2004. The entire disclosure of the application referenced above is incorporated herein by reference.

FIELD

Embodiments of the present invention relate generally to image data processing, and in particular, look-up tables used in image data processing.

BACKGROUND

Today, an ever-increasing number of mobile devices, such as PDAs and cellular telephones, are being outfitted with digital cameras and video recorders. Such digital cameras use sensors to which capture images in a digital data format, i.e., as bits; zeros and ones. Digital data processing involves manipulating these bits to enhance the resultant image, or for other purposes, such as convenient storage.

There are numerous well-known image data processing operations that can be performed on digital image data. These include companding (reducing the bit-depth of the image data), gamma correction (compensating for brightness differences), sensor correction (compensating for sensor non-linearity), and illumination correction (compensating for changed illumination environment, e.g. inside or outside) to name a few. All of the data processing operations mentioned above may be implemented using a transfer function to describe the appropriate adjustment. A transfer function is merely a function that maps input values to output values according to a formula or curve.

Transfer functions can be implemented in hardware as look-up tables (LUT) to increase processing speed. However, a full LUT representing all possible outputs of a transfer function takes up a lot of memory. One way to reduce the memory required to store the LUT is to have the LUT store only sample outputs of the transfer function. However, sampling the transfer function compromises accuracy and flexibility.

BRIEF DESCRIPTION OF DRAWINGS

Embodiments of the present invention are illustrated by way of example, and not by way of limitation, in the figures of the accompanying drawings in which like reference numerals refer to similar elements and in which.

DESCRIPTION

Image Processing Device

Figure 1:
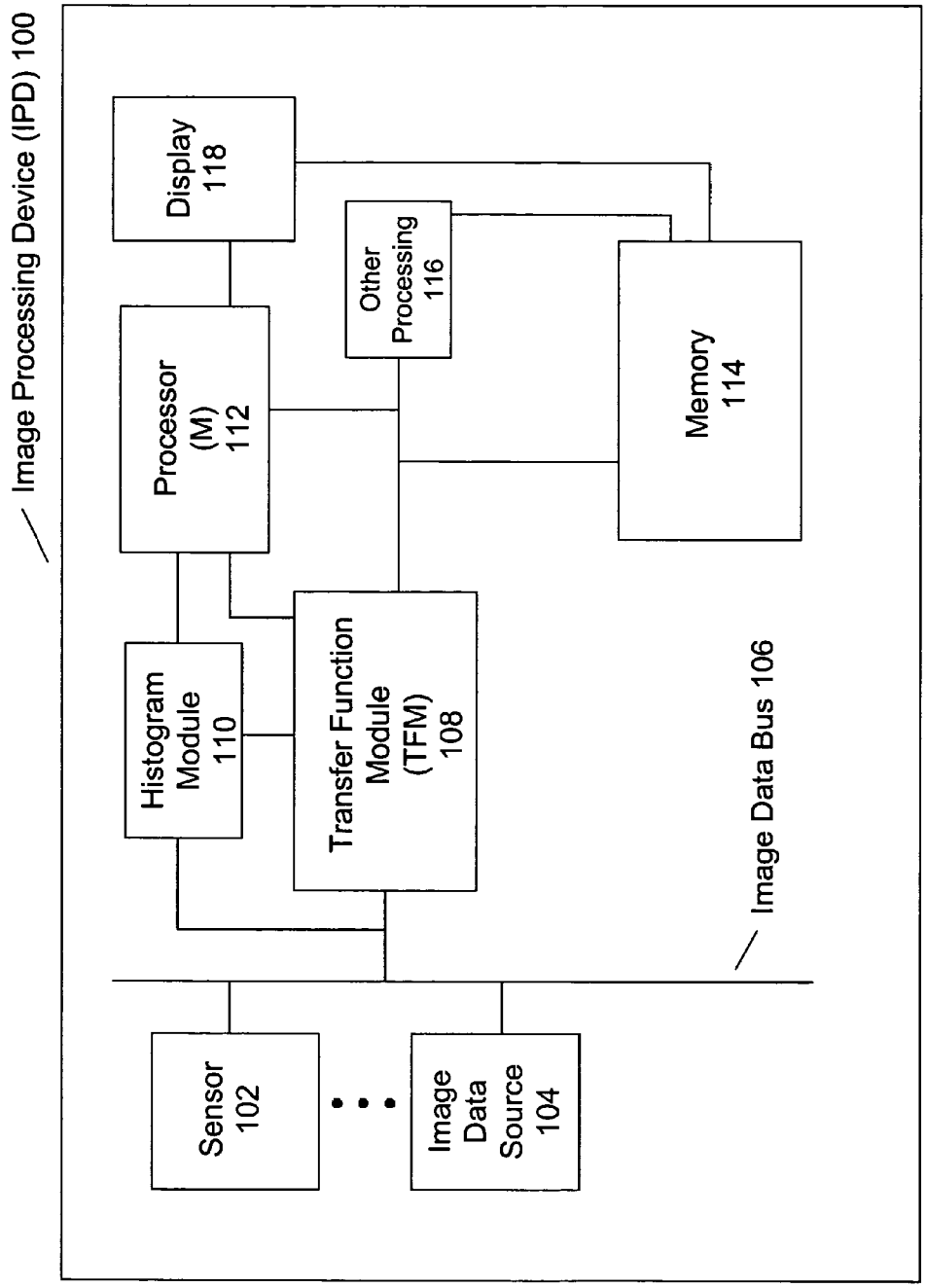
FIG. 1 is a block diagram of an image processing device according to one embodiment of the present invention.

FIG. 1 shows an example generic image processing device (IPD) 100 in which embodiments of the present invention can be implemented. The IPD can be a digital camera (either one capable of only still photography, one capable of video capture, also known as a camcorder, or both), a cellular phone with imaging capabilities, a personal digital assistant (PDA) with imaging capabilities, a personal computer (PC), a mobile computer such as a laptop, or any other computing device with image processing capabilities. The IPD 100 need not poses image capturing capabilities, the image data can be fed from some source to the IPD 100.

In one embodiment, the IPD 100 includes a sensor 102 that can convert light into digital image data. The sensor 102 can be a Complementary Metal Oxide Semiconductor (CMOS) image sensor, a Charge Coupled Device (CCD)-type sensor, or any other sensor used for digital photography. The IPD 100 may further include any number of image data sources 104, such as a processor or some memory that feeds image data onto the image data bus 106. The image data bus 106 can carry image data output by the sensor 102 or other image data source 104, in various formats, such as raw image data of any depth (e.g., 12 bit, 10 bit, 9 bit, 8 bit) or color space-specific pre-processed data, e.g., YcbCr or RGB data (8 bit).

The image data can then undergo various image data processing. In one embodiment, if the image data is in a 9 or 10 bit format, the image data can be companded into an 8 bit format to increase processing speed, reduce the storage requirements, and decrease the memory bandwidth required to transfer the image to the targeted memory resources. A companding (compress-expand) operation can be performed using a transfer function. A transfer function maps inputs in the input range to outputs in the output range and describes the functioning of the appropriate system, in this case, the companding operation. The transfer function can be linear, but more often is represented by a curve.

To increase processing speed, a transfer function can be represented by look-up table (LUT). A LUT can be an indexed data structure storing the outputs of the transfer function. The mapping of the transfer function can then be represented by an addressing scheme that maps the inputs to an index of the LUT, where the indexed output represents the output associated with the input by the transfer function.

Transfer functions can also be used for gamma correction, compensating for sensor non-linearity, illumination correction, and various other image processing operations. In one embodiment, all required corrections can be implemented using a single transfer function. Thus, the image data from the image data bus 106 is further processed by the transfer function module (TFM) 108, which maps the input image data to output image data according to a transfer function. Since transfer function can be used for various data processing operations, the TFM 108 has a generic name. However, in some embodiments, the TFM 108 could be referred to as a compand module, gamma correction module, and so on, according to specific functionality associated with the transfer function.

In one embodiment, the image data is also observed by a histogram module 110. The histogram module can tag colors and perform statistical analysis on the incoming image data to determine the appropriate transfer function to be used for the appropriate operations. Thus, in one embodiment, the histogram module 100 provides the information used to program the LUT(s) implementing the appropriate transfer function. How the appropriate transfer function is determined by the histogram module 110 is well understood by those skilled in the art.

The IPD 100 can include various other components. In one embodiment, the IPD 100 includes a processor 112 controlling the operation of the IPD 100, and a memory 114 to store an operating system and for storage to store the output of the TFM 108. The IPD 100 can also have further processing modules 116 that process the image data further. The IPD 100 can also have a display 118 that can display the image data as an image to a user. The IPD 100 can also have various other components, such as a user interface, a radio transceiver, an audio input/output, and other hardware and software depending on the specific type of IPD 100 implemented.

Transfer Functions Module

Figure 2:
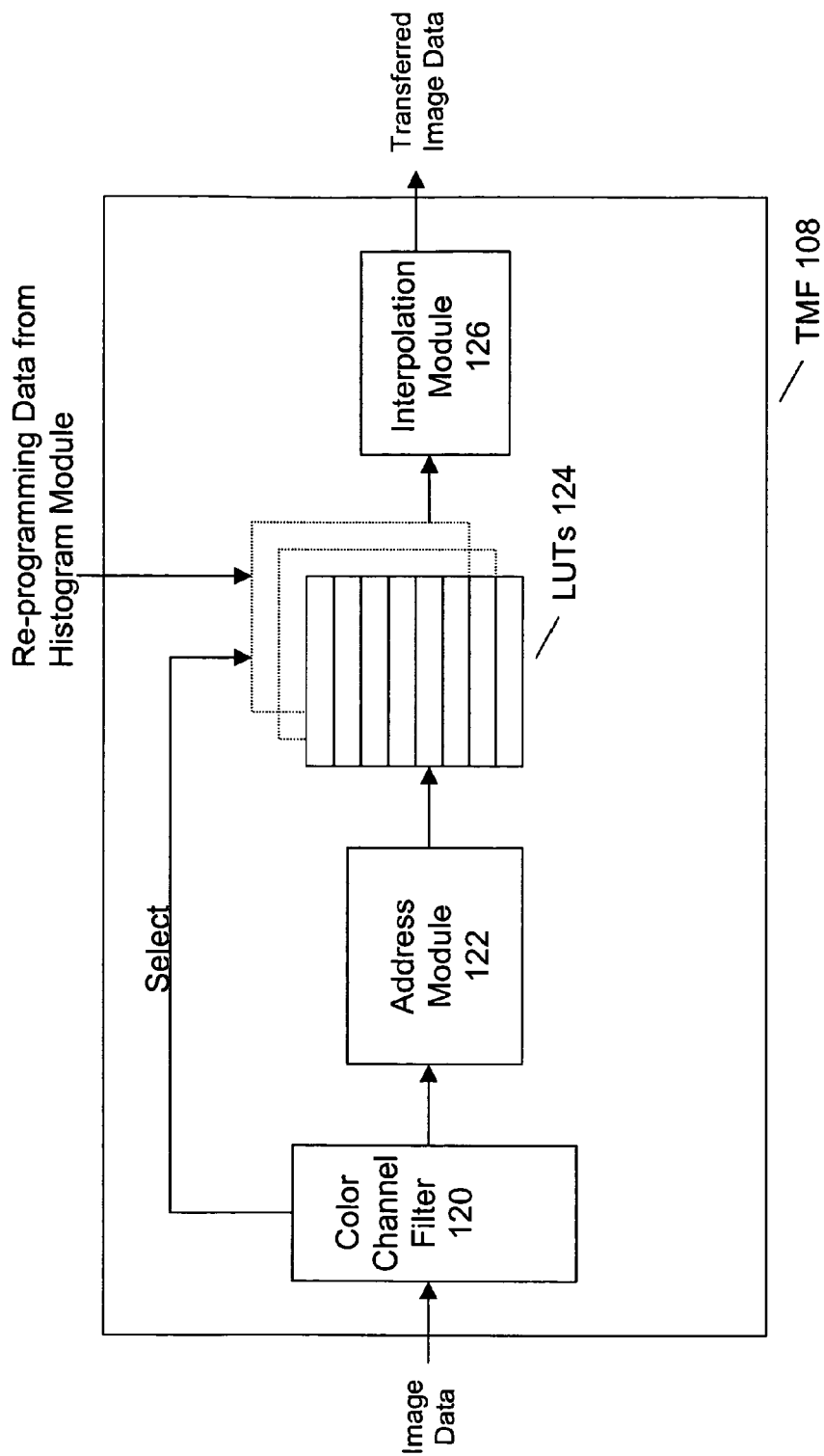
FIG. 2 is a block diagram of a transfer function module according to one embodiment of the present invention.

One embodiment of the present invention is now described with reference to FIG. 2. FIG. 2 shows an expanded view of the TFM 108 from FIG. 1. The input of the TFM 108 is image data in any format, and the output of the TFM 108 is here generally referred to as transferred image data. This generic term is used, since in some embodiments, the output may be gamma corrected image data, companded image data, and so on.

In one embodiment, the image data is first received by a color channel filter (CCF) 120. The CCF 120 determines the color of the input data based on the image protocol being used. For example, for raw Bayer pattern RGB image data, the CCF 120 would know to expect red/green alternating for one image row, and green/blue alternating for the next image row. In one embodiment, the color of the input image data determines which LUT 124 to use. In FIG. 2, there are three LUTs 124 shown for simplicity. The specific number of the LUTs depends, in one embodiment, on the number of colors (or other indicators such as hue or brightness) used by the color space of the image data.

In one embodiment, the image data next enters the address module 122. The address module 122 maps the image data to an index into the selected LUT 124. In other words, the image data is used to address into the LUT 124. The index, i.e., address, is mapped such that the LUT entry at the address is the output of the transfer function associated with the input image data.

As mentioned above, in one embodiment, the LUT 124 does not contain all possible outputs in the output range of the transfer function. Instead, the transfer function is sampled. That is, the input range of the transfer function is divided into segments, and one sample input is chosen for each segment. For example, a sample input is chosen at every $6^{th}$ possible input over the input range. Then, the transfer function is calculated for these sample inputs, and these sample outputs can be stored in the LUT 124. Some accuracy lost by sampling can be regained by passing sample output from the LUT 124 to an interpolation module 126 where some kind of interpolation can be performed to create an output value between two sample output values. Various interpolation techniques, including linear interpolation can be implemented by the interpolation module 126.

Look-Up Tables

As discussed above, transfer functions are generally represented by a curve that maps the input range to the output range. When the curve is close to a straight line, i.e., has relatively low curvature, much of the accuracy lost by sampling can be regained using interpolation. However, when the curve is not straight or close to straight, i.e., has high curvature, interpolation cannot recapture some, or much, of the accuracy lost to sampling. The difference between high or low curvature can be dependent on error toleration factors, and can be expressed mathematically by the absolute value of the second order derivative of the transfer function. In one embodiment, a high curvature region is defined as one with an average curvature above a certain threshold, e.g., 5.

Figure 3:
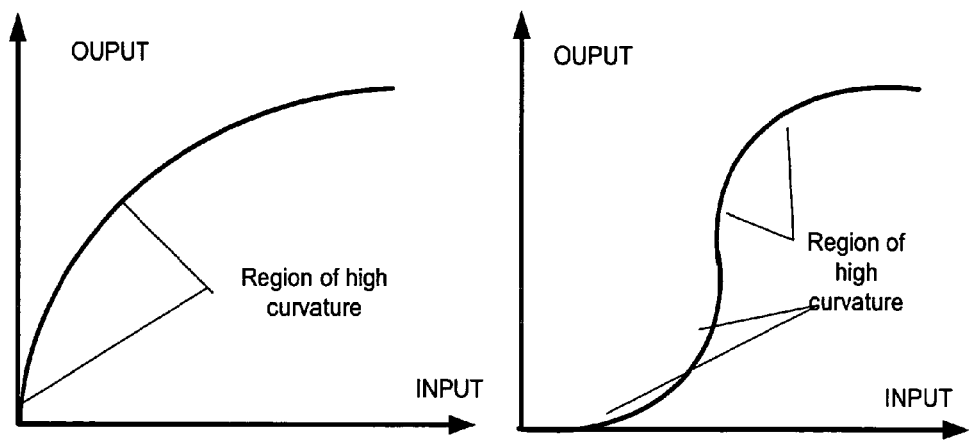
FIG. 3 is a graph demonstrating two example transfer functions.

Many real life transfer functions have both high-curvature and low-curvature portions, as shown in FIG. 3. Since LUTs 124 are fixed in size, they can only store a certain number of samples. Since even a relatively few samples can accurately reflect the low-curvature regions of the transfer function, when used with interpolation, it can help accuracy to reallocate more of the fixed number of samples to the high-curvature regions of the transfer function. Thus, in one embodiment, the LUT 124 is re-programmable by the histogram module 110 to flexibly allocate more output samples to high-curvature regions. In one embodiment, the addressing scheme performed by the address module 122 takes account of this flexibility and properly maps the input image data to LUT addresses despite the flexibility of the LUT 124.

Figure 4:
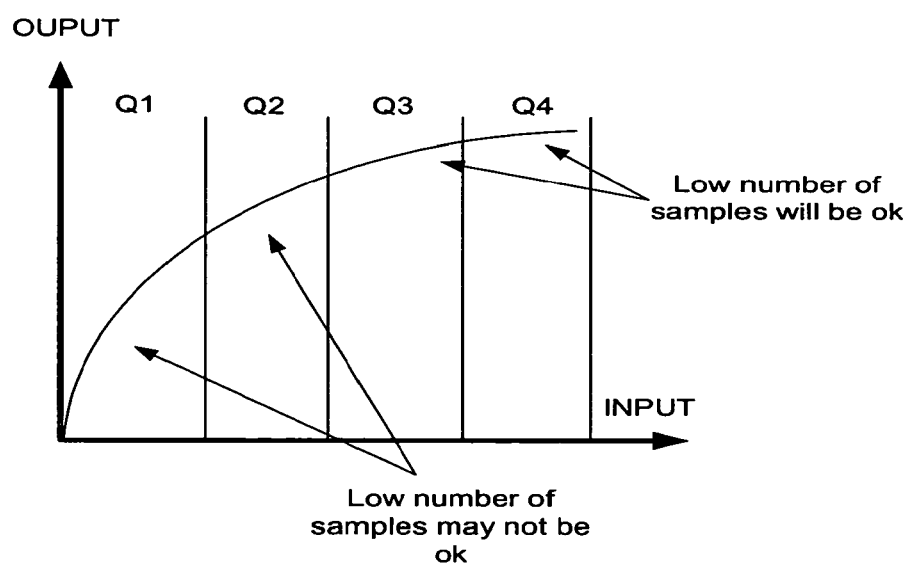
FIG. 4 is a graph demonstrating partitioning a transfer function according to one embodiment of the present invention.

In one embodiment, the transfer function to be represented by the LUT 124 is divided into equal, or substantially equal regions over the input range. An embodiment using four quartile regions (or quartiles) is shown in FIG. 4. Quartiles Q3 and Q4 are low curvature regions in which a low number of samples may be sufficient. However, quartiles Q1 and Q2 are higher-curvature regions, where accuracy can be significantly improved by using a more samples. The embodiments of the present invention are not limited to four such regions, more or less can be used as desired.

Figure 5:
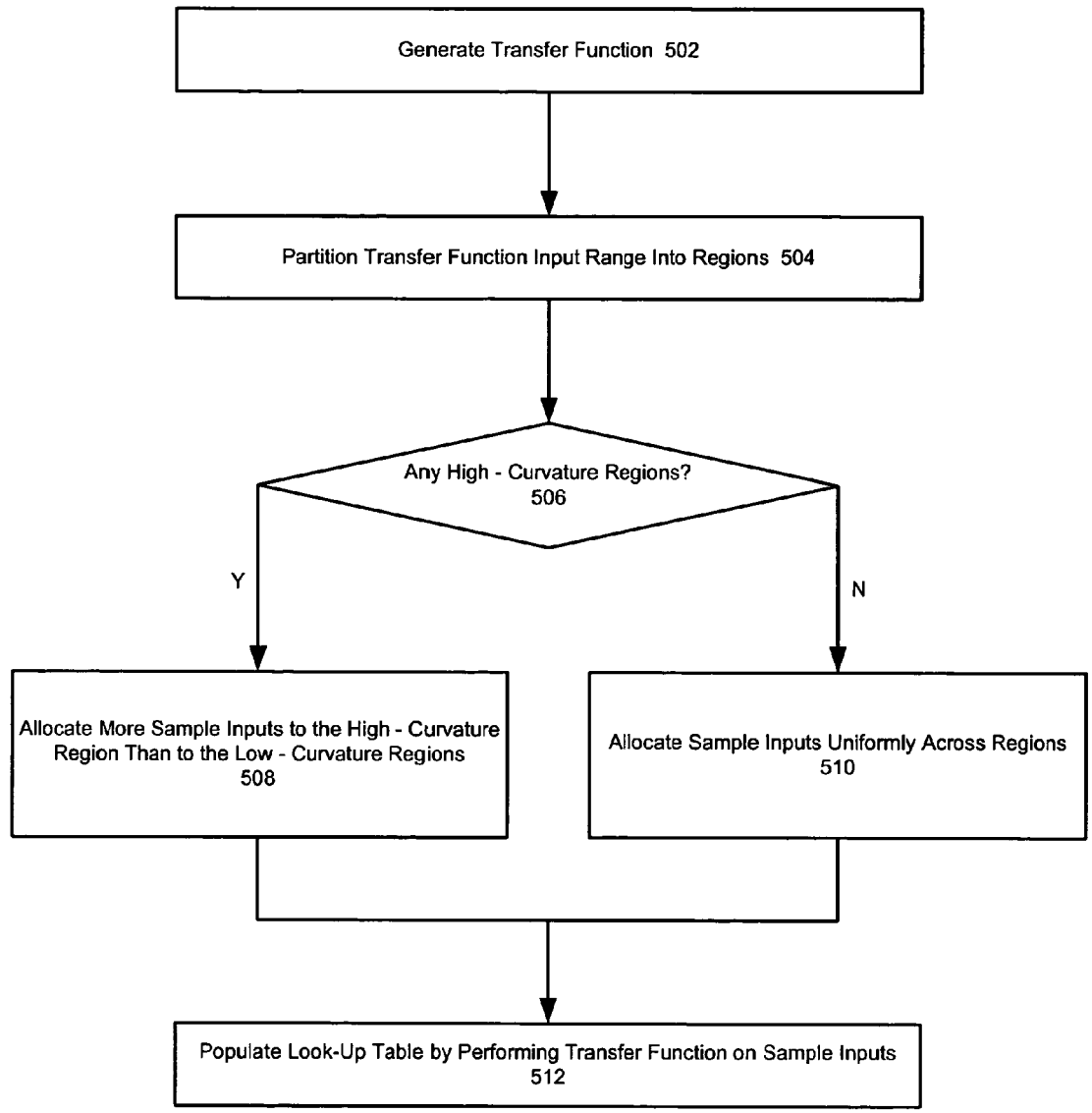
FIG. 5 is a flow diagram of reprogramming a look-up table according to one embodiment of the present invention.

One embodiment of re-programming the LUT 124 is now described with reference to FIG. 5. In block 502, a transfer function to be used for processing image data is generated. In one embodiment, this can be done according to known statistical methods. In block 504, the input range of the transfer function is partitioned into regions. In one embodiment, the regions are substantially equal in size. There can be any number of regions. In three example embodiments there are two, four, and eight regions respectively.

In block 506, a determination is made as to whether any of the regions are high-curvature regions, as explained with reference to FIGS. 3 and 4. In there are no high-curvature regions, the sample inputs are allocated uniformly across the various regions, in block 510. However, if one or more regions are identified as high-curvature, then, in block 508, more sample inputs are allocated to these high-curvature regions. In one embodiment, up to half (50 percent) of the regions can be designated as high-curvature.

In one embodiment the number of input samples equals the number of possible entries in the LUT 124. After all the input samples are allocated across the regions according to either block 508 or 510, the transfer function is applied to the input samples, and the results (output samples) are used to populate the entries of the LUT 124.

Demonstrative Example

Figure 6:
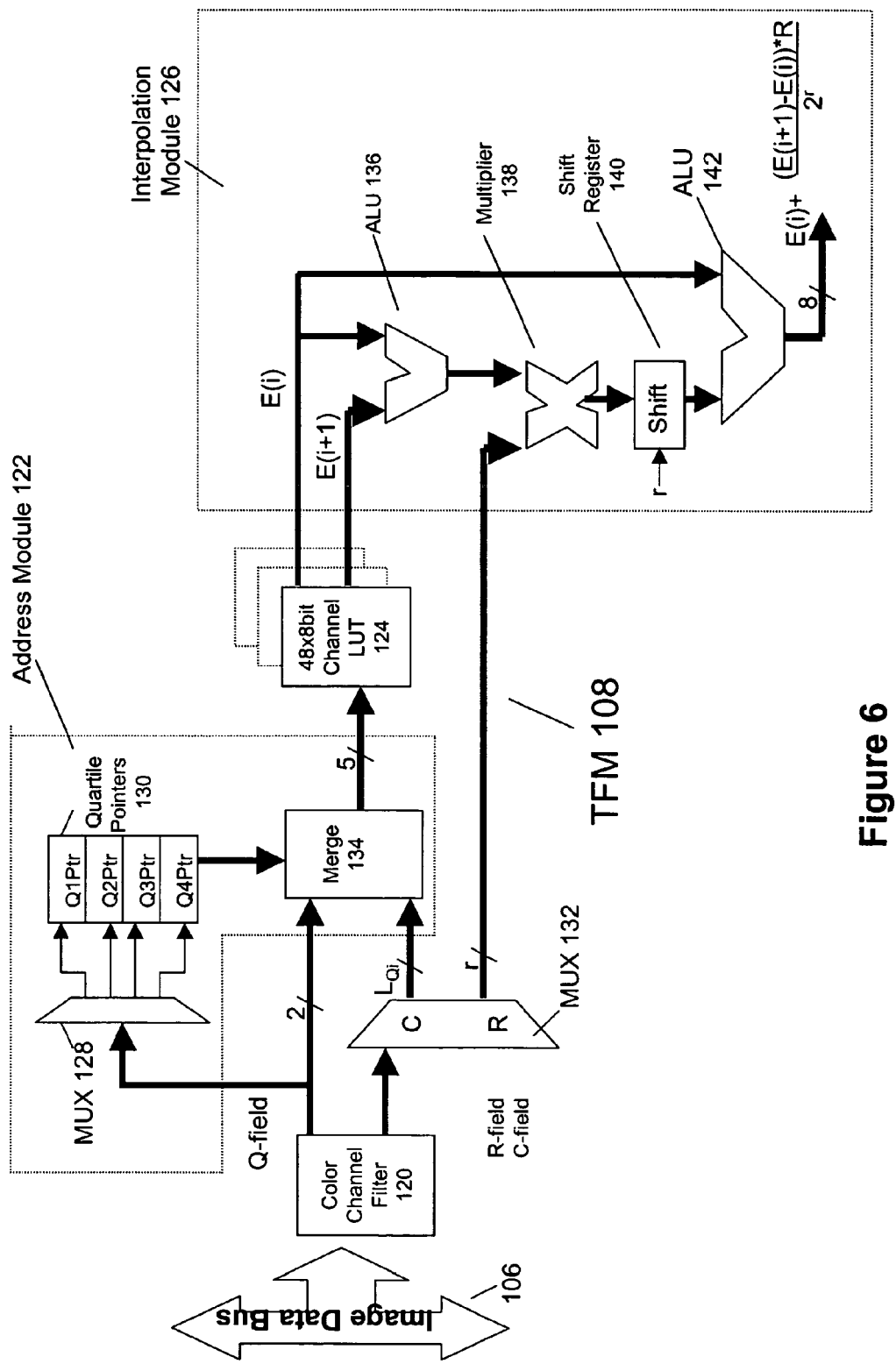
FIG. 6 is an architectural block diagram demonstrating image processing by an image processing device according to one embodiment of the present invention.

One embodiment for a hardware implementation of the TFM 108 is now described with reference to FIG. 6. In FIG. 6, the image data from the image data bus 106 first passes through the CCF 120. As described above, the CCF 120 determines the color of the image data and selects the appropriate LUT 124 based on this color. In this embodiment, the LUTs 124 are 48×8 bit tables, one for each color channel. Each 8-bit entry is an output sample of a transfer function implemented by the TFM 108.

In the embodiment shown in FIG. 6, the CCF 120 also determines which quadrant the input image data belongs to. Depending on the quadrant, the CCF 120 divides the image data up into three fields, here referred descriptively as Q (quadrant), C (coarseness) and R (residue) fields. Non-descriptivelly, these fields can be referred to as first, second, and third parts or sections of the image data, respectively.

Since there are four quadrants, two bits will identify the quadrant of the image data. Thus, the most significant two bits make up the Q field. The number of bits in the C field (here referred to as $L_{Qi}$) depends on the quadrant, and more specifically on how many samples were allocated to the particular quadrant. For example, if the input image data belongs to a quartile with 4 samples, the C field can have 2 bits. However, if the quartile has 8 samples, the C filed can have 3 bits. The bits not allocated to either Q or C fields are field R, the residual bits. The size of the R field depends on the size of the C field and the number of input bits in the image data.

Multiplexer 128 uses the Q field to select the appropriate quartile pointer 130, as indicated by the Q field. Upon the programming of the LUTs 124, when the number of samples per quartile is set, the quartile pointers 130 are calculated, in one embodiment, as follows in Equations 1-4:

$$Q1\text{-Pointer} = \text{base address of channel LUT} \quad (\text{Eq. 1})$$

$$Q2\text{-Pointer} = Q1\text{-Pointer} + 2L_{Q1} \quad (\text{Eq. 2})$$

$$Q3\text{-Pointer} = Q1\text{-Pointer} + 2L_{Q1} + 2L_{Q2} \quad (\text{Eq. 3})$$

$$Q4\text{-Pointer} = Q1\text{-Pointer} + 2L_{Q1} + 2L_{Q2} + 2L_{Q3} \quad (\text{Eq. 4})$$

where $L_{Qi}$ is the number of samples allocated to quartile number i.

Thus, if the Q field places the input data image in quartile Q2, then multiplexer 128 selects the Q2-Pointer from the quartile pointers 130. In one embodiment, multiplexer 132 selects the C field of the image data and merge 134 merges the selected quartile pointer with the C field to generate the index of the LUT entry. That is, the quartile pointer and the C field are combined to address into the selected LUT 124. The entry corresponding the this index is referred to as E(i) in FIG. 6.

Next, interpolation is performed to produce the transferred image data. In one embodiment, the interpolation produces the result shown in Equation 5:

$$\text{Out}(i) = E(i) + \frac{E(i+1) - E(i)}{2^r} \cdot R \quad (\text{Eq. 5})$$

where Out(i) is the output of the TFM 108, i.e., the transferred image data, E(i+1) is the LUT entry after the indexed LUT entry, R is the binary value in the R field of the image data, and r is the number of bits in the R field. In one embodiment, arithmetic logic units 136 and 142 are used in conjunction with multiplier 138 and shift register 140 in the arrangement shown in FIG. 6 to perform the calculations required by Equation 5.

General Matters

Although the present system will be discussed with reference to various illustrated examples, these examples should not be read to limit the broader spirit and scope of the embodiments of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of operations or acts leading to a desired result. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the embodiments of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Thus, a machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals). Regardless of the format, the computer programming, rendering and processing techniques discussed herein are simply examples of the types of programming, rendering and processing techniques that may be used to implement aspects of the various embodiments of the present invention. These examples should in no way limit the embodiments of the present invention, which is best understood with reference to the claims that follow this description.

Thus, an image processing device has been described. In the forgoing description, various specific values were given names, such as "image data" and "quartile pointer," and various specific modules, such as the "interpolation module" and "transfer function module" have been described. However, these names are merely to describe and illustrate various aspects of the embodiments of the present invention, and in no way limit the scope of the embodiments of the present invention. Furthermore, various modules, such as the TFM 108 and the histogram module 110 in FIG. 1, can be implemented as software or hardware modules, or without dividing their functionalities into modules at all. The embodiments of the present invention are not limited to any modular architecture either in software or in hardware, whether described above or not.

What is claimed is:

1. A system, comprising:
   an image data source configured to provide image data;
   a transfer function module configured to
   generate a transfer function to process the image data,
   define a first region of the transfer function, wherein a curvature of the transfer function in the first region is less than or equal to a threshold,
   define a second region of the transfer function, wherein a curvature of the transfer function in the second region is greater than the threshold,
   allocate a first number of sample inputs of the image data to the first region of the transfer function,
   allocate a second number of the sample inputs of the image data to the second region of the transfer function, wherein the second number is greater than the first number,
   map the sample inputs to sample outputs using the transfer function, wherein the sample outputs correspond to outputs of the transfer function, and
   populate entries of a lookup table with the sample outputs; and
   a processor configured to process the image data based on the entries of the lookup table.

2. The system of claim 1, wherein, to define the second region of the transfer function, the transfer function module is configured to (i) divide an input range of the transfer function into a plurality of regions and (ii) measure a curvature of the transfer function in each of the plurality of regions.

3. The system of claim 2, wherein the plurality of regions corresponds to four regions.

4. The system of claim 1, wherein the transfer function module is configured to index each of the entries of the lookup table based on which of the first region and the second region the sample inputs corresponding to the entries are from.

5. The system of claim 1, wherein the transfer function module includes the lookup table.

6. The system of claim 1, wherein the transfer function module includes an address module configured to index the image data to a corresponding address of the lookup table.

7. The system of claim 1, wherein the transfer function module includes an interpolation module configured to interpolate between two of the sample outputs to calculate an output image data value.

8. The system of claim 1, wherein the transfer function module includes a color filter configured to (i) determine a color of the image data and (ii) select, based on the determined color, the lookup table from a plurality of lookup tables.

9. The system of claim 1, further comprising a histogram module configured to (i) receive the image data, (ii) provide, based on the image data, information to the transfer function module, wherein the information is used by the transfer function module to generate the transfer function.

10. A device including a digital camera, the digital camera comprising the system of claim 1.

11. A method, comprising:
    generating a transfer function to process image data;
    defining a first region of the transfer function, wherein a curvature of the transfer function in the first region is less than or equal to a threshold;
    defining a second region of the transfer function, wherein a curvature of the transfer function in the second region is greater than the threshold;
    allocating a first number of sample inputs of the image data to the first region of the transfer function;
    allocating a second number of the sample inputs of the image data to the second region of the transfer function, wherein the second number is greater than the first number;
    mapping the sample inputs to sample outputs using the transfer function, wherein the sample outputs correspond to outputs of the transfer function;
    populating entries of a lookup table with the sample outputs; and
    processing the image data based on the entries of the lookup table.

12. The method of claim 11, wherein defining the second region of the transfer function includes (i) dividing an input range of the transfer function into a plurality of regions and (ii) measuring a curvature of the transfer function in each of the plurality of regions.

13. The method of claim 12, wherein the plurality of regions corresponds to four regions.

14. The method of claim 11, further comprising indexing each of the entries of the lookup table based on which of the first region and the second region the sample inputs corresponding to the entries are from.

15. The method of claim 11, further comprising storing the lookup table in memory.

16. The method of claim 11, further comprising indexing the image data to a corresponding address of the lookup table.

17. The method of claim 11, further comprising interpolating between two of the sample outputs to calculate an output image data value.

18. The method of claim 11, further comprising:
    determining a color of the image data; and
    selecting, based on the determined color, the lookup table from a plurality of lookup tables.

19. The method of claim 11, further comprising, using a histogram module
    receiving the image data, and
    providing, based on the image data, information used to generate the transfer function.

20. The method of claim 11, further comprising generating the image data using a digital camera.

* * * * *